United States Patent
Kawasaki et al.

(10) Patent No.: US 12,381,309 B2
(45) Date of Patent: Aug. 5, 2025

(54) ANTENNA MOUNTED ON WEARABLE DEVICE

(71) Applicant: TOSHIBA TEC KABUSHIKI KAISHA, Tokyo (JP)

(72) Inventors: Yuki Kawasaki, Numazu Shizuoka (JP); Sadatoshi Oishi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 813 days.

(21) Appl. No.: 17/391,484

(22) Filed: Aug. 2, 2021

(65) Prior Publication Data

US 2022/0149509 A1 May 12, 2022

(30) Foreign Application Priority Data

Nov. 10, 2020 (JP) .................... 2020-186926

(51) Int. Cl.
*H01Q 1/27* (2006.01)
*G06F 1/16* (2006.01)
*G06K 7/10* (2006.01)
*G06K 19/07* (2006.01)
*H01Q 1/48* (2006.01)

(52) U.S. Cl.
CPC ............. *H01Q 1/273* (2013.01); *G06F 1/163* (2013.01); *G06K 7/10366* (2013.01); *G06K 19/0723* (2013.01); *H01Q 1/48* (2013.01)

(58) Field of Classification Search
CPC ... G06K 7/10396; H01Q 1/273; H01Q 9/0407
See application file for complete search history.

(56) References Cited

U.S. PATENT DOCUMENTS

| | | | |
|---|---|---|---|
| 2003/0169207 A1 | 9/2003 | Beigel | |
| 2010/0109966 A1* | 5/2010 | Mateychuk | H01Q 9/42 427/2.24 |
| 2020/0295437 A1* | 9/2020 | Ueda | H01Q 9/0407 |
| 2021/0356550 A1* | 11/2021 | Lee | H01Q 1/526 |
| 2024/0115202 A1* | 4/2024 | Tran | A61B 5/002 |

* cited by examiner

*Primary Examiner* — Graham P Smith
(74) *Attorney, Agent, or Firm* — Kim & Stewart LLP (57) ABSTRACT

According to one embodiment, an antenna for a wearable electronic device includes a first dielectric substrate with a first surface and a second surface located on opposite sides, a ground plate on the first surface, and a second dielectric substrate with a third surface and a fourth surface located on opposite sides. The third surface is bonded to the second surface and at least partially within an outer perimeter of the second surface. A radiating element is disposed on the fourth surface.

20 Claims, 8 Drawing Sheets

FIG. 10

# ANTENNA MOUNTED ON WEARABLE DEVICE

CROSS-REFERENCE TO RELATED APPLICATION

This application is based upon and claims the benefit of priority from Japanese Patent Application No. 2020-186926, filed Nov. 10, 2020, the entire contents of which are incorporated herein by reference.

FIELD

Embodiments described herein relate generally to antennas mounted in or on wearable electronic devices.

BACKGROUND

A wearable electronic device may have a communication function by which the device communicates with different devices or the like. This type of wearable electronic device generally needs an antenna. However, it is typically desirable that the wearable electronic device be a small size. Therefore, it is desirable that the antenna be incorporated in the wearable electronic device with little unused or "dead" space.

DETAILED DESCRIPTION

According to one embodiment, an antenna for a wearable electronic device includes a first dielectric substrate with a first surface and a second surface located on opposite sides, a ground plate on the first surface, and a second dielectric substrate with a third surface and a fourth surface located on opposite sides. The third surface is bonded to the second surface and at least partially within an outer perimeter of the second surface. A radiating element is disposed on the fourth surface.

Hereinafter, certain example embodiments will be described with reference to the drawings. In the drawings, similar components are denoted by the same reference numerals. The drawings are schematic and conceptual and are not necessarily to scale.

Figure 1:
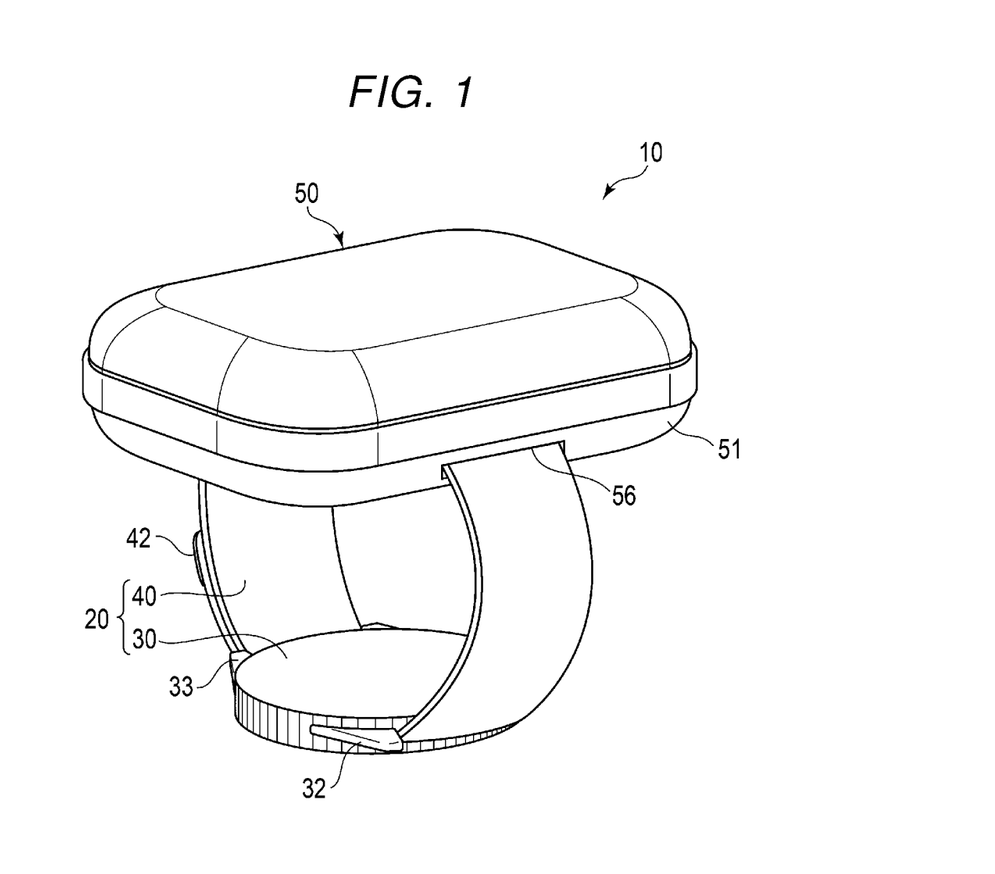
FIG. 1 is a perspective view illustrating aspects of a wearable device according to an embodiment.
Figure 2:
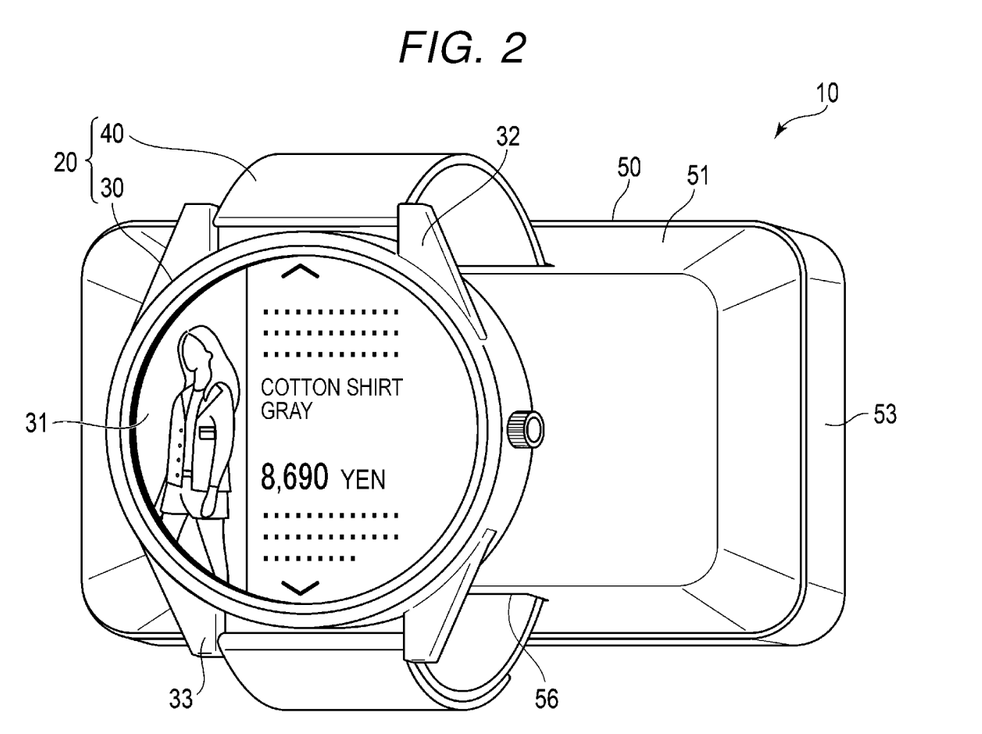
FIG. 2 is another perspective view illustrating aspects of a wearable device.

FIG. 1 is a perspective view illustrating a wearable device 10 according to an embodiment. FIG. 2 is another perspective view illustrating the wearable device 10 from a direction different from that of FIG. 1.

As illustrated in FIGS. 1 and 2, the wearable device 10 comprises a wristwatch-type device 20 and a sensor device 50 which is attached to the wristwatch-type device 20.

The wristwatch-type device 20 includes a smart device 30 and a band 40 permitting the smart device 30 to be worn on the wrist or lower forearm of a user. In the following description, relational expressions referencing the front and the rear of wearable device 10 or sub-components thereof correspond to the following convention: the side closer to the hand is the front, and the side closer to the elbow is the rear. Similarly, the hand is said to be in front of the wrist, which is front of the forearm, which is in front of the elbow.

The smart device 30, in this example, is a smart watch or other smart terminal device. The smart device 30 has various functions such as a date and time display function, a health tracking function, an incoming call notification function, a voice calling function, an information communication function, and a music playback function.

The smart device 30 has a display unit 31 that displays information to the user as text, icons, symbols, pictures, or the like. For example, the display unit 31 comprises a touch screen and is a liquid crystal display (LCD) screen or the like. In this example, the display unit 31 functions as both an input and an output device for information. The smart device 30 incorporates a microcomputer that executes the processing associated with the display information on the display unit 31 and the receiving of information via the display unit 31. The microcomputer also cooperates with the required devices to perform the various functions described above.

The smart device 30 has a pair of attachment portions 32 and 33 for attaching the band 40. Each of the attachment portions 32 and 33 includes a pair of protrusions and a pin supported by the pair of protrusions.

In the present embodiment, one end portion of the band 40 is connected to the attachment portion 32 by the pin of the attachment portion 32. For example, the band 40 is provided with a through hole at the end portion which is connected to the attachment portion 32 by passing the pin through the through hole.

The band 40 is similarly attached by a pin of the attachment portion 33. The band 40 is provided with a fastener 42, and thus, the band 40 can be fastened to a desired position.

The sensor device 50 has a function of reading information by wireless communication. For example, the sensor device 50 is an RFID reader. That is, the sensor device 50 can read the information that has been written in an RFID tag. The sensor device 50 may also be able to write information into an RFID tag. The sensor device 50 transmits the information read from the RFID tag to the smart device 30 by wireless communication.

The sensor device 50 has a rounded rectangular parallelepiped appearance shape. In this context, a rounded rectangular parallelepiped denotes a shape in which a rectangular parallelepiped shape has rounded corners and/or edges. For example, in a rounded rectangular parallelepiped, corner portions where three planes intersect and portions corresponding to corner portions where two planes intersect in an original rectangular parallelepiped are rounded or chamfered. Furthermore, the rounded rectangular parallelepiped is configured with a smooth curved surface of which planar portion is convex outward in the original rectangular parallelepiped.

The surface of the sensor device 50 that is facing the forearm when the wearable device 10 is being worn is referred to as a lower surface, and the surface opposite to the lower surface is referred to as an upper surface. In addition, a side of the sensor device 50 extending along the length direction elbow to wrist direction) of the forearm during wearing of the wearable device 10 is referred to as a long side, and a side of the sensor device 50 extending across the length direction of forearm is referred to as a short side. Similarly, for the sensor device 50, with the surface facing away from the forearm during wear is referred to an upper side.

The sensor device 50 is attached to the band 40 so as to be located on the opposite side of the arm from the smart device 30 during wearing of the wearable device 10. The sensor device 50 is attached to the wristwatch-type device 20 so that the short side of the sensor device 50 extends along the band 40. In other words, the sensor device 50 is attached to the wristwatch-type device 20 so that the long side of the sensor device 50 extends perpendicularly to the wrapping direction of the band 40.

The sensor device 50 has an attachment portion 56 that is attached to the band 40 in the vicinity of the lower surface of the sensor device 50. For example, the attachment portion 56 is an elongated through hole through which the band 40 is passed. The through hole extends through the sensor device 50 from short side to short side.

However, the configuration of the attachment portion 56 is not limited thereto. The attachment portion 56 may have any configuration as long as the sensor device 50 can be attached to the band 40. For example, the attachment portion 56 may be a pair of U-shaped pins fixed to the sensor device 50. In such an example, the band 40 would be passed through the gap between the sensor device 50 and the U-shaped pin.

Figure 3:
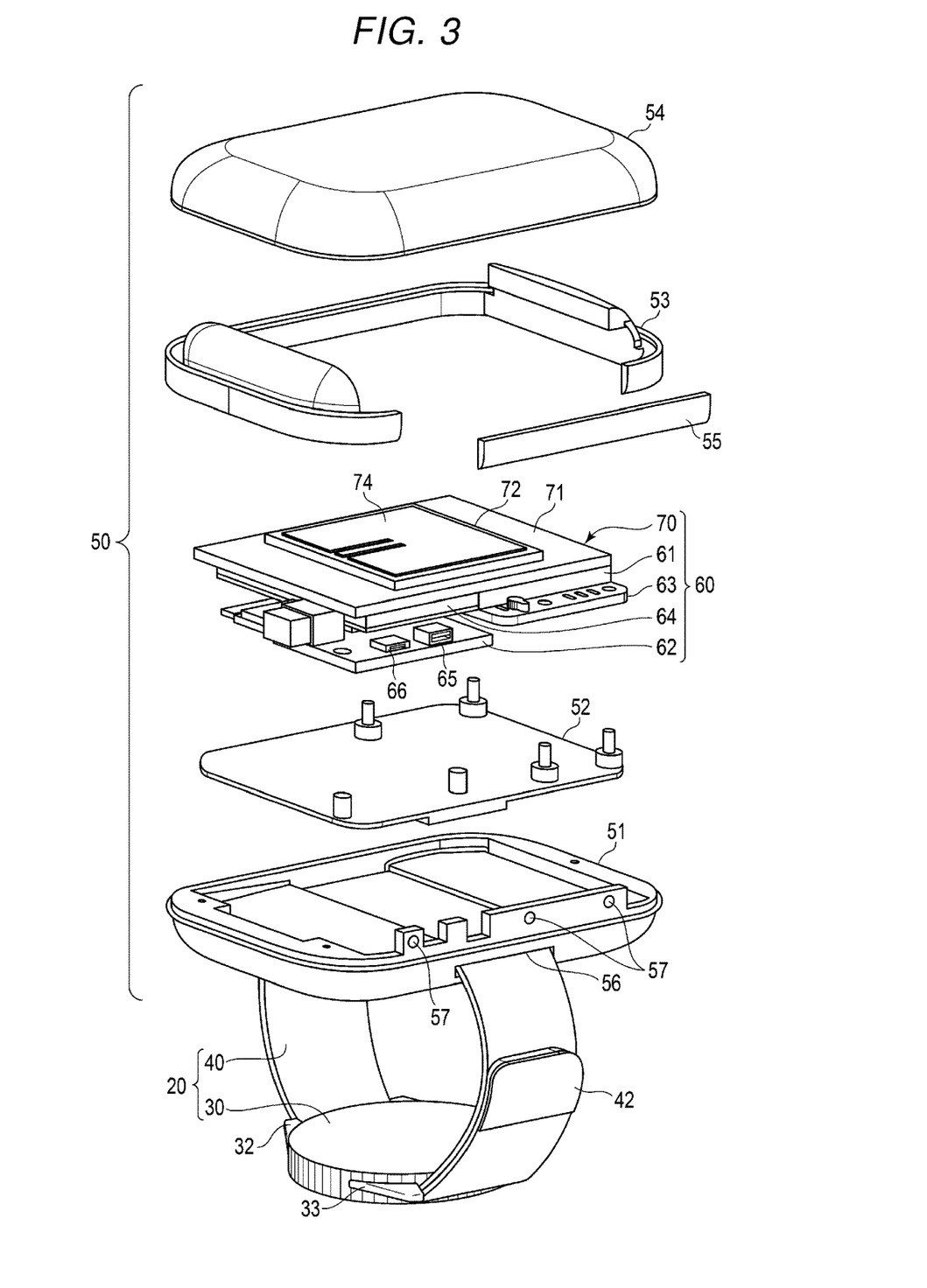
FIG. 3 depicts a wearable device with a sensor device in a disassembled view.

FIG. 3 is a perspective view of the wearable device 10 in which the sensor device 50 is illustrated as disassembled into various sub-components.

As illustrated in FIG. 3, the sensor device 50 includes a bottom cover 51, a unit base 52, a middle part 53, a top cover 54, a USB cover 55, and an internal part 60.

The bottom cover 51 forms the lower surface of the sensor device 50, and the top cover 54 forms the upper surface of the sensor device 50. The bottom cover 51 has the attachment portion 56 with an elongated through hole, through which the band 40 is passed. The bottom cover 51 and the top cover 54 are joined to each other via the middle part 53.

The middle part 53 extends along the periphery of the sensor device 50, except for a portion of one side along the long side of the sensor device 50. In this example, the middle part 53 has a notch portion along a long side of the sensor device 50. The USB cover 55 exactly fits in the notch portion of the middle part 53 and engages with the notch portion of the middle part 53. That is, the middle part 53 and the USB cover 55 are disposed between the bottom cover 51 and the top cover 54, and form a side peripheral surface of the sensor device 50. The top cover 54, the bottom cover 51, and the middle part 53 together form a sensor case or housing or an outer part thereof.

The unit base 52 is fixed to the bottom cover 51. In addition, the unit base 52 holds the internal part 60 once the sensor device 50 is assembled.

The internal part 60 includes, for example, an RFID module 61, an I/F board 62, a charging board 63, a battery 64, and an antenna 70.

The RFID module 61 cooperates with the antenna 70 for reading information using wireless communication.

The I/F board 62 has, for example, a USB terminal 65 and a micro USB terminal 66 connected to the outside. The I/F board 62 is supplied with power and information. The battery 64 is an example of a power storage element and supplies power to the RFID module 61. The battery 64 is charged by the charging board 63.

Figure 4:
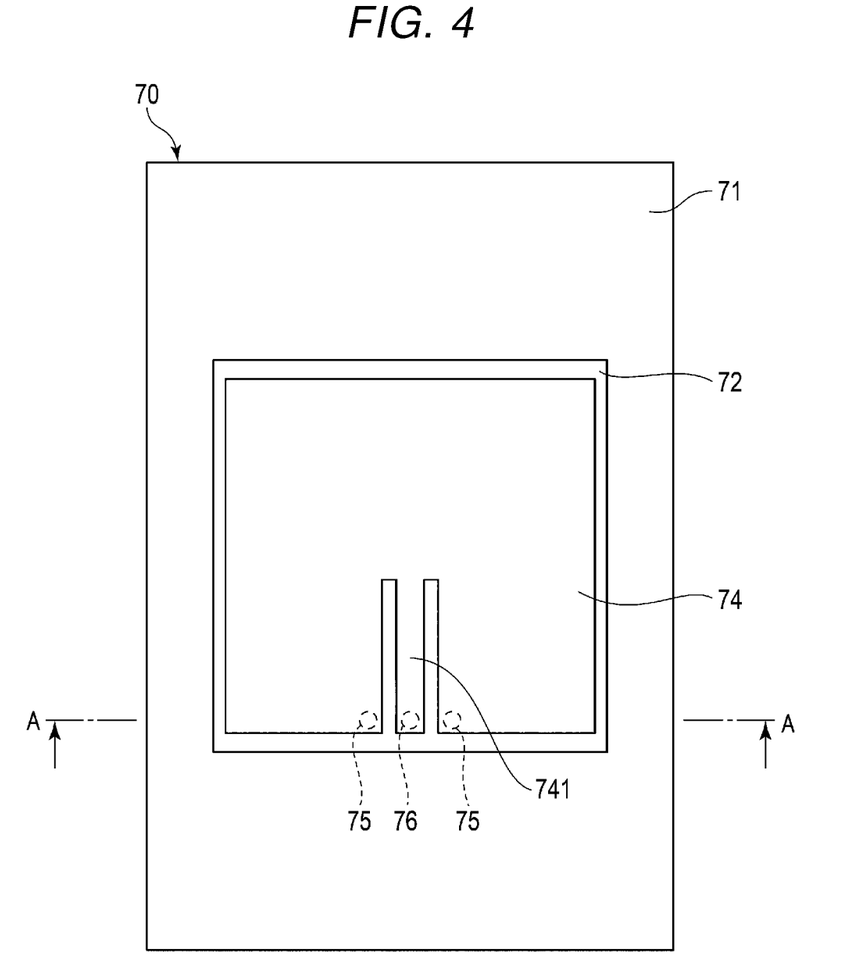
FIG. 4 is a plan view of an antenna.
Figure 5:
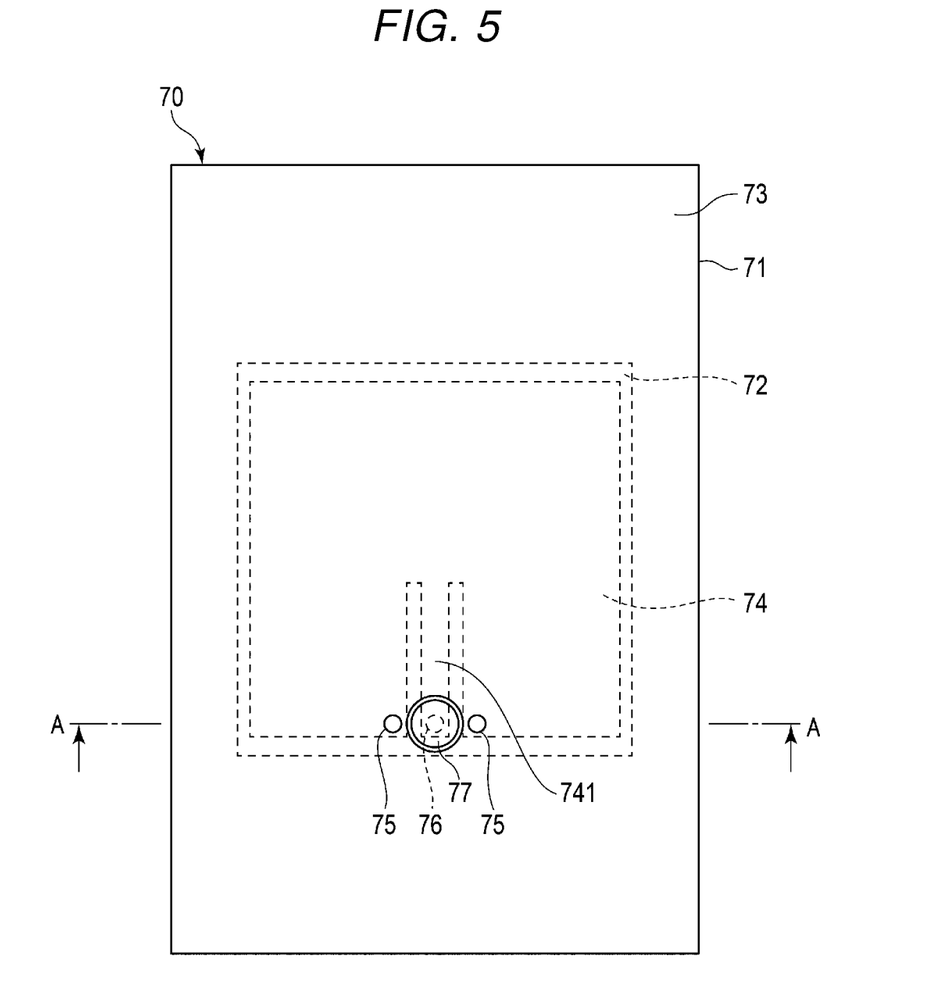
FIG. 5 is a plan view of a backside of an antenna.
Figure 6:
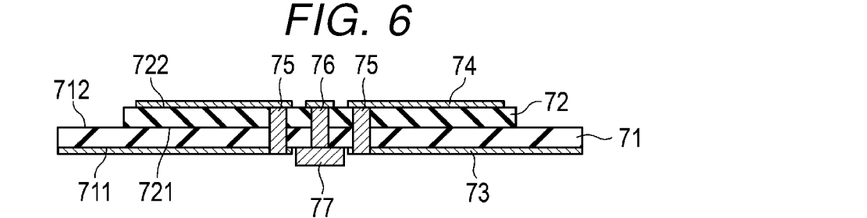
FIG. 6 is a cross-sectional view of an antenna taken along line A-A in FIGS. 4 and 5.

FIG. 4 is a plan view of the antenna 70. FIG. 5 is a plan view of the antenna 70 as viewed from the back side of the antenna 70. FIG. 6 is a cross-sectional view of the antenna 70 taken along the A-A line illustrated in FIGS. 4 and 5.

As illustrated in FIGS. 4 to 6, the antenna 70 comprises a first dielectric substrate 71, a second dielectric substrate 72, a ground plate 73, and a radiating element 74.

The first dielectric substrate 71 has a first plane 711 and a second plane 712 located on opposite sides of each other, and the ground plate 73 is provided on the first plane 711 of the first dielectric substrate 71.

The second dielectric substrate 72 has a third plane 721 and a fourth plane 722 located on opposite sides of each other, and the radiating element 74 is provided on the fourth plane 722 of the second dielectric substrate 72.

The third plane 721 of the second dielectric substrate 72 is bonded to the second plane 712 of the first dielectric substrate 71.

The planar area of the third plane 721 is less than the planar area of the second plane 712. The third plane 721 is positioned and sized to be inside the outer contour (outer perimeter) of the second plane 712.

For example, the second dielectric substrate 72 is located to be centered within outer contour shape of the second plane 712 of the first dielectric substrate 71. Thus, as illustrated in FIG. 6, the cross section of the antenna 70 has a convex shape, that is the center of antenna 70 is higher in the vertical direction (up-down page direction in FIG. 6 corresponding to the orthogonal direction from first plane 711 to fourth plane 722) than the outer edges of the antenna 70. FIG. 6 illustrates the cross section of the antenna 70 along the side. Therefore, FIG. 6 illustrates that the cross section of the antenna 70 from long side to long side has a convex shape. However, as can be seen in FIG. 4, cross section of the antenna 70 from short side to short side also similarly has a convex shape.

However, in some examples, the third plane 721 of the second dielectric substrate 72 is not necessarily located fully inside the outer contour of the second plane 712 of the first dielectric substrate 71. That is, in some examples, the third plane 721 may just be partially located inside the outer contour of the second plane 712 rather than entirely. In other words, the second dielectric substrate 72 at least partially overlaps the first dielectric substrate 71.

As illustrated in FIG. 4, the radiating element 74 is formed to be slightly smaller in planar dimensions than the fourth plane 722 of the second dielectric substrate 72. Additionally, the radiating element 74 is formed with a pair of notch portions extending in parallel with each other. Accordingly, the radiating element 74 has a strip line 741 extending between the pair of notch portions.

The radiating element 74 thus covers the fourth plane 722 of the second dielectric substrate 72, except for the outer peripheral portion of the fourth plane 722 and at the pair of notch portions.

In some examples, the radiating element 74 may entirely cover the fourth plane 722, excepting for the notch portions formed therein. That is, the radiating element 74 may cover the outer peripheral portion of the fourth plane 722 of the second dielectric substrate 72 rather than leaving such portion exposed.

The distal end portion (portion near outer edge of fourth plane 722) of the strip line 741 is electrically connected to a power feeding terminal 77 provided on the first plane 711 of the first dielectric substrate 71. The connection between the distal end portion of the strip line 741 and the power feeding terminal 77 is made via a conductive portion 76 that extends through the first dielectric substrate 71 and the second dielectric substrate 72. The power feeding terminal 77 is separated from the ground plate 73 and electrically insulated from the ground plate 73.

The radiating element 74 is electrically connected to the ground plate 73 via a conductive portion 75 extending through the first dielectric substrate 71 and the second dielectric substrate 72. A conductive portion 75 is provided on both sides of the distal end portion of the strip line 741.

As illustrated in FIG. 5, the ground plate 73 covers the entire first plane 711 of the first dielectric substrate 71 except at the power feeding terminal 77 and an area surrounding the power feeding terminal 77.

However, in some examples, the ground plate 73 may just partially cover the first plane 711 of the first dielectric substrate 71 rather than entirely cover the first plane 711 (excepting at the power feeding terminal 77 and an area surrounding the power feeding terminal 77).

As can be seen in FIG. 5, the radiating element 74 is located inside the outer contour of the ground plate 73 as seen in a projection of the ground plate 73 onto the first plane 711. However, the radiating element 74 is not necessarily limited thereto and may in other examples only partially overlap the ground plate 73.

For example, the ground plate 73 may be just partially formed on the first plane 711, and the radiating element 74 may have a portion which does not overlap the ground plate 73.

In general, antenna 70 need only to have a portion where the radiating element 74 overlaps with the ground plate 73 to the extent necessary for the antenna 70 to function as required according to intended design constraints or the like. Of course, in general, the larger the area of the overlap between the radiating element 74 and the ground plate 73, the better the performance of antenna 70 performance to be expected, all other things being equal.

Figure 7:
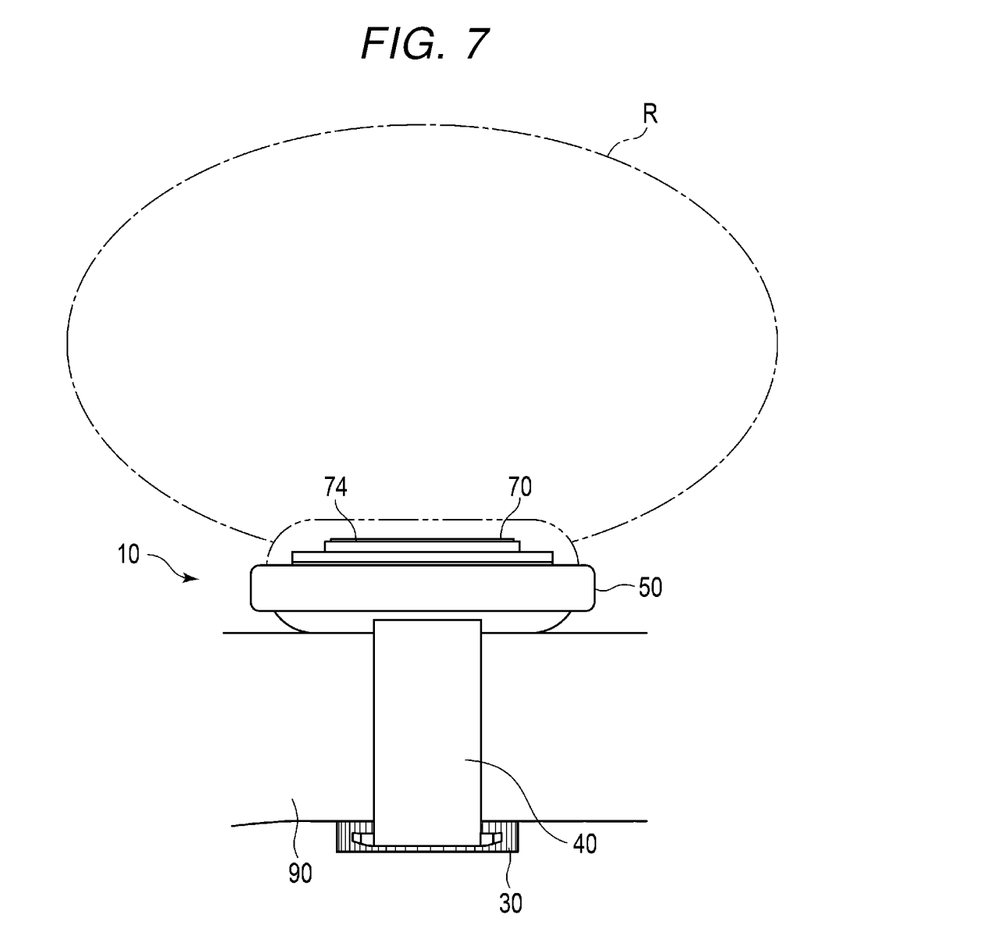
FIG. 7 is a diagram illustrating an example of a wearable device being worn and a reading range of a sensor device.

In the antenna 70 according to the present embodiment, the reading range of the antenna 70 spreads outward in a direction from the first dielectric substrate 71 to the radiating element 74. FIG. 7 is a diagram illustrating the wearable device 10 according to an embodiment being worn and the reading range R of the sensor device 50.

As illustrated in FIG. 7, the band 40 of the wearable device 10 is worn on a forearm 90. The antenna 70 is mounted inside the sensor device 50 such that the radiating element 74 is located away from the band 40. As described above, the attachment portion 56 of the band 40 is provided near the lower surface of the sensor device 50. Therefore, the antenna 70 is mounted inside the sensor device 50 so that the radiating element 74 is located on the side of the upper surface.

Accordingly, when the wearable device 10 is worn on the forearm 90, the first dielectric substrate 71 is disposed on the side closer to the forearm 90, and the second dielectric substrate 72 is disposed on the side away from the forearm 90. As a result, the reading range R by the antenna 70 preferably extends to the space above the sensor device 50 without intersecting the forearm 90.

Figure 8:
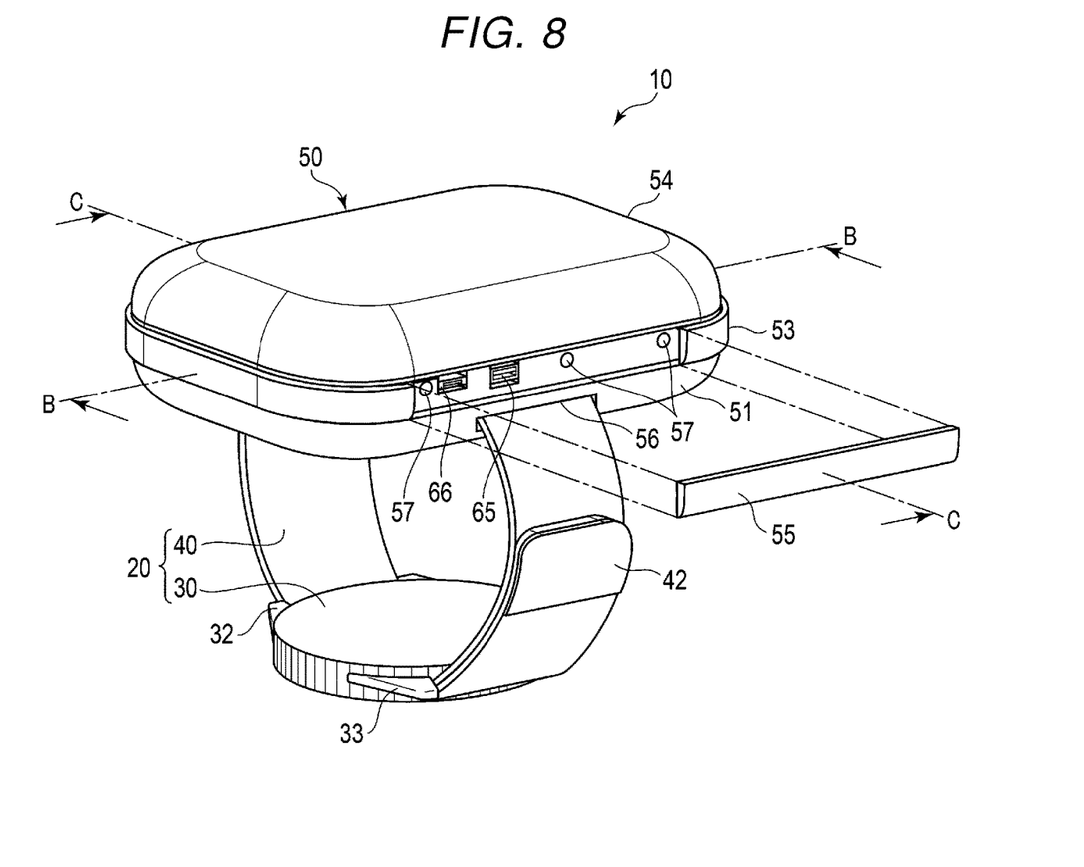
FIG. 8 is a perspective view of a wearable device with a USB cover removed from a sensor device.

FIG. 8 is a perspective view of the wearable device 10 according to an embodiment in a state in which the USB cover 55 has been removed from the sensor device 50.

As illustrated in FIG. 8, the USB terminal 65 and the micro USB terminal 66 are exposed from the notch portion of the middle part 53. The USB cover 55 fits exactly in the notch portion of the middle part 53. The USB cover 55 is made of a magnetic material. A plurality of magnets 57 can be provided in the exposed from the notch portion of the middle part 53. The USB cover 55 is held in the notch portion of the middle part 53 by the magnets 57.

Figure 9:
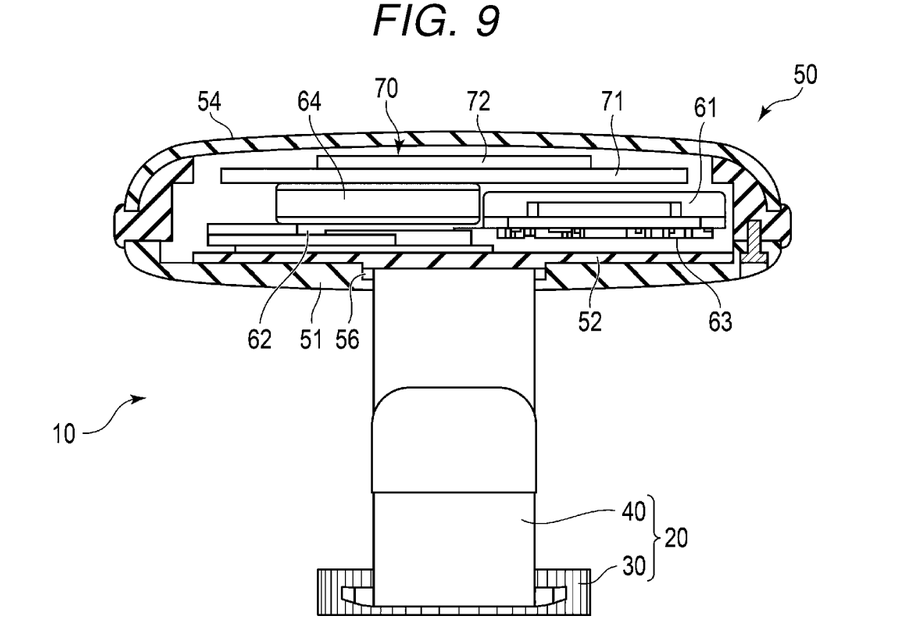
FIG. 9 is a diagram illustrating a cross section of a sensor device taken along line B-B in FIG. 8.
Figure 10:
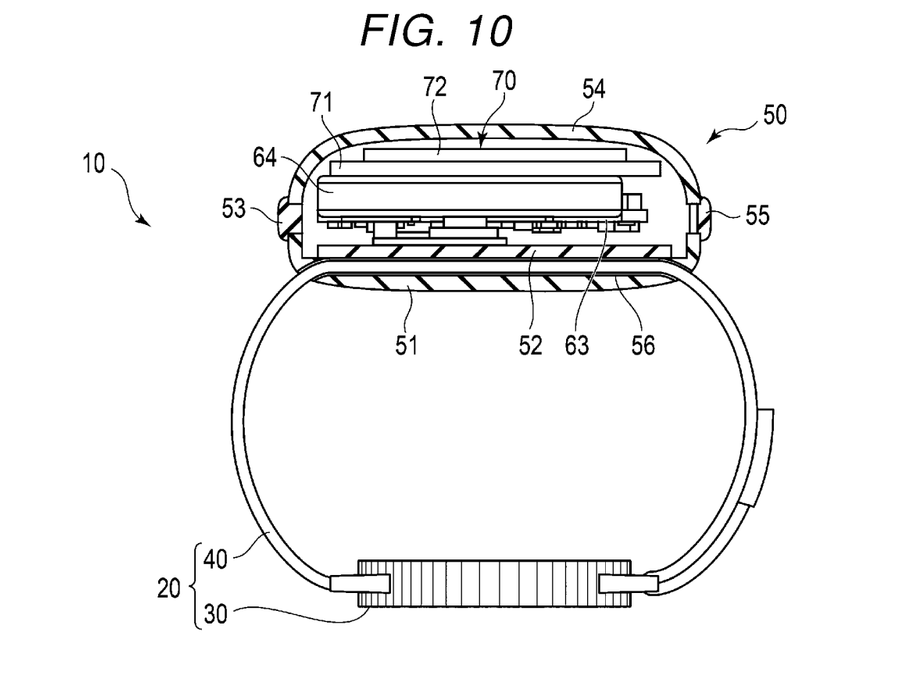
FIG. 10 is a diagram illustrating a cross section of a sensor device taken along C-C line in FIG. 8.

FIG. 9 is a diagram illustrating a cross section of the sensor device taken along line B-B illustrated in FIG. 8. FIG. 10 is a diagram illustrating a cross section of the sensor device taken along line C-C illustrated in FIG. 8.

As illustrated in FIGS. 9 and 10, the sensor device 50 has a rounded shape. Particularly, in this example, the outer surface of the top cover 54 is rounded. The inner surface of the top cover 54 is also rounded to correspond to the outer surface. Therefore, the internal space of the sensor device 50, particularly the portion(s) defined by the top cover 54, is greatly reduced as it goes from the center to the edge.

The antenna 70 is disposed on the uppermost side of the internal part 60. In addition, as described above, the antenna 70 has a convex cross section. For this reason, with the antenna 70, the space occupied inside of the sensor device 50 is smaller at the outer edge portions of the antenna 70 than at the central portions. Therefore, the antenna 70 can be housed in the available internal space of the sensor device 50 more conveniently leaving less internal dead (unfilled) space within the sensor 50.

As described above, in a wearable device 10 according to an embodiment, the ground plate 73 of antenna 70 is provided on the first dielectric substrate 71. The radiating element 74 is provided on the second dielectric substrate 72 but is smaller in outer planar dimensions than the first dielectric substrate 71. The ground plate 73 and the radiating element 74 are on the outside surfaces of the antenna 70. The first dielectric substrate 71 and the second dielectric substrate 72 are bonded to each other, but the second dielectric substrate 72 is positioned to be inside the outer contour of the first dielectric substrate 71, such that overall, the antenna 70 has a convex cross-sectional shape and can thus be mounted within a sensor device 50 having a rounded shape with less dead space than otherwise.

In the examples, the first dielectric substrate 71 and the second dielectric substrate 72 are depicted as rectangular plate members. However, the shapes of the first dielectric substrate 71 and the second dielectric substrate 72 are not limited thereto, and any shape may be used. For example, the first dielectric substrate 71 and the second dielectric substrate 72 may be plate members with rounded or chamfered corners but otherwise rectangular in shape.

In addition, the planar areas of the first plane 711 and the second plane 712 of the first dielectric substrate 71 need not necessarily be the same as one another, but may be different from each other in some examples. Similarly, the planar areas of the third plane 721 and the fourth plane 722 of the second dielectric substrate 72 need not necessarily be the same as one another, but may be different from each other in some examples.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An antenna for a wearable electronic device, the antenna comprising:
    a first dielectric substrate with a first surface and a second surface located on opposite sides;
    a ground plate on the first surface;
    a second dielectric substrate with a third surface and a fourth surface located on opposite sides, the third surface bonded to the second surface and at least partially within an outer perimeter of the second surface;
    a radiating element on the fourth surface;
    a first conductive portion that extends from the ground plate to the radiating element in a first direction that is perpendicular to the first surface, the first conductive portion penetrating the first and second dielectric substrates in the first direction; and
    a second conductive portion that extends parallel to the first conductive portion from the ground plate to the radiating element through the first and second dielectric substrates, wherein
    the radiating element includes a pair of notches extending parallel to each other along the fourth surface and between which the second conductive portion contacts the radiating element.

2. The antenna according to claim 1, wherein the radiating element includes a portion that overlaps the ground plate when viewed in the first direction.

3. The antenna according to claim 1, wherein the radiating element entirely overlaps the ground plate when viewed in the first direction.

4. The antenna according to claim 1, wherein the ground plate covers the entire first surface.

5. The antenna according to claim 4, wherein the radiating element partially covers the fourth surface.

6. The antenna according to claim 1, wherein the radiating element partially covers the fourth surface.

7. The antenna according to claim 6, wherein the radiating element does not cover an outer peripheral portion of the fourth surface.

8. The antenna according to claim 1, wherein the notches extend from an outer edge of the radiating element towards a central portion of the radiating element.

9. The antenna according to claim 1, further comprising:
    a sensor case mounted on a band configured to be worn on a body of a user, wherein
    the radiating element is positioned adjacent to an outer facing surface of the sensor case, the outer facing surface facing away from the body of the user when the sensor case is worn on the body of the user using the band.

10. A wearable electronic device, comprising:
    a sensor case mounted on a band to be worn on a body of a user; and
    an antenna including:
        a first dielectric substrate with a first surface and a second surface located on opposite sides;
        a ground plate on the first surface;
        a second dielectric substrate with a third surface and a fourth surface located on opposite sides, the third surface bonded to the second surface and at least partially within an outer perimeter of the second surface;
        a radiating element on the fourth surface;
        a first conductive portion that extends from the ground plate to the radiating element in a first direction that is perpendicular to the first surface, the first conductive portion penetrating the first and second dielectric substrates in the first direction; and
        a second conductive portion that extends parallel to the first conductive portion from the ground plate to the radiating element through the first and second dielectric substrates, wherein
        the radiating element is positioned adjacent to an outer facing surface of the sensor case, the outer facing surface facing away from the body of the user when the sensor case is worn on the body of the user using the band, and
        the radiating element includes a pair of notches extending parallel to each other along the fourth surface and between which the second conductive portion contacts the radiating element.

11. The wearable electronic device according to claim 10, wherein the radiating element includes a portion that overlaps the ground plate when viewed in the first direction.

12. The wearable electronic device according to claim 10, wherein the notches extend from an outer edge of the radiating element towards a central portion of the radiating element.

13. The wearable electronic device according to claim 10, further comprising:
    a smart terminal mounted to the band, the body of the user being between the smart terminal and the sensor case when the band is worn on the body of the user.

14. The wearable electronic device according to claim 10, wherein the sensor case has rounded edges.

15. The antenna according to claim 1, wherein a length of the first dielectric substrate is greater than a length of the second dielectric substrate in a second direction parallel to the first surface.

16. The antenna according to claim 1, wherein the first conductive portion is a columnar shape and extends straight from a surface of the ground plate to a surface of the radiating element in the first direction.

17. The antenna according to claim 1, further comprising:
    a third conductive portion that extends parallel to the first and second conductive portions from the ground plate to the radiating element through the first and second dielectric substrates, wherein
    the second conductive portion is between the first and third conductive portions.

18. The antenna according to claim 1, wherein
    a length of each of the notches extending along the fourth surface is greater than a total thickness of the first dielectric substrate, the ground plate, the second dielectric substrate, and the radiating element in the first direction.

19. The antenna according to claim 1, wherein
    the second conductive portion is shorter than the first conductive portion in the first direction.

20. The antenna according to claim 1, further comprising:
    a terminal electrically connected to the radiating element through the second conductive portion and overlapping a part of the notches when viewed in the first direction.

* * * * *